United States Patent
Bunel et al.

(10) Patent No.: US 10,532,429 B2
(45) Date of Patent: Jan. 14, 2020

(54) METHOD FOR PERFORATING A WALL OF A COMBUSTION CHAMBER

(75) Inventors: Jacques Marcel Arthur Bunel, Thiais (FR); Mario César De Sousa, Cesson (FR); Fabrice Dominguez, Othis (FR); Bouzid Rabia, Savigny le Temple (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 1284 days.

(21) Appl. No.: 13/981,237

(22) PCT Filed: Jan. 24, 2012

(86) PCT No.: PCT/FR2012/050153
§ 371 (c)(1),
(2), (4) Date: Jul. 23, 2013

(87) PCT Pub. No.: WO2012/101376
PCT Pub. Date: Aug. 2, 2012

(65) Prior Publication Data
US 2013/0299472 A1    Nov. 14, 2013

(30) Foreign Application Priority Data

Jan. 24, 2011 (FR) .................................. 11 50547

(51) Int. Cl.
*B23K 26/382* (2014.01)
*B23K 26/073* (2006.01)
(Continued)

(52) U.S. Cl.
CPC ........ *B23K 26/389* (2015.10); *B23K 26/0736* (2013.01); *B26F 1/26* (2013.01);
(Continued)

(58) Field of Classification Search
CPC .......... B23K 2201/001; B23K 26/0736; B23K 26/388; B23K 26/389; B26F 1/26;
(Continued)

(56) References Cited

U.S. PATENT DOCUMENTS 2,601,000 A * 6/1952 Nerad .................. F23C 99/00
60/758
3,440,818 A * 4/1969 Caruel .................. F23R 3/04
60/726
(Continued)

FOREIGN PATENT DOCUMENTS

EP    0 976 487 B1    6/2003
EP    2 149 675 A2    2/2010
(Continued)

OTHER PUBLICATIONS

International Search Report as issued for PCT/FR2012/050153.

*Primary Examiner* — Dana Ross
*Assistant Examiner* — Ket D Dang
(74) *Attorney, Agent, or Firm* — Pillsbury Winthrop Shaw Pittman LLP

(57) ABSTRACT

A method for perforating a wall, includes calculating mechanical stresses applied on the wall for a use of the wall. The method further includes perforating an orifice in a first determined zone of the wall, the perforation being made using a tool with a cross-section dependent on the mechanical stresses calculated in the first determined zone.

11 Claims, 4 Drawing Sheets

(51) Int. Cl.
  *B26F 1/26* (2006.01)
  *F23R 3/06* (2006.01)
  *B23K 101/00* (2006.01)

(52) U.S. Cl.
  CPC .......... *F23R 3/06* (2013.01); *B23K 2101/001* (2018.08); *F23R 2900/00018* (2013.01); *Y02T 50/675* (2013.01); *Y10T 83/0591* (2015.04); *Y10T 428/24273* (2015.01)

(58) Field of Classification Search
  CPC ............. F23R 2900/00018; F23R 3/06; Y02T 50/675; Y10T 428/24273; Y10T 83/0591
  USPC ... 219/121.71, 121.7, 121.84, 121.6, 121.61, 219/121.63, 121.72, 121.68, 121.82, 219/121.83; 83/53; 428/131; 60/752–760, 746, 747, 748, 804, 796, 60/800, 772; 415/115, 116; 416/96 R, 416/96 A, 97 A, 90 R; 427/453, 446, 427/140, 142, 331; 198/340, 341.01, 493
  See application file for complete search history.

(56) References Cited

U.S. PATENT DOCUMENTS

| | | | | |
|---|---|---|---|---|
| 4,550,562 A | * | 11/1985 | Rice | F01K 23/10 60/728 |
| 4,824,712 A | * | 4/1989 | Falleroni | C03B 27/012 428/137 |
| 5,139,888 A | * | 8/1992 | Selwood | B23K 11/185 428/594 |
| 5,209,067 A | * | 5/1993 | Barbier | F23R 3/06 60/757 |
| 5,683,600 A | * | 11/1997 | Kelley | B23K 26/06 219/121.71 |
| 6,368,060 B1 | * | 4/2002 | Fehrenbach | F01D 5/186 416/97 A |
| 6,452,063 B1 | * | 9/2002 | Curro | A61F 13/49011 428/131 |
| 6,640,547 B2 | * | 11/2003 | Leahy, Jr. | F01D 9/023 60/752 |
| 6,663,919 B2 | * | 12/2003 | Farmer | B23P 6/002 29/889.1 |
| 7,078,088 B2 | * | 7/2006 | Price | A47J 47/005 269/289 R |
| 7,202,441 B2 | * | 4/2007 | Klugl | B23K 26/388 219/121.71 |
| 8,157,525 B2 | * | 4/2012 | Brittingham | F01D 5/189 29/889.721 |
| 2002/0036115 A1 | * | 3/2002 | Wilson | B32B 3/20 181/292 |
| 2003/0019848 A1 | * | 1/2003 | Nicholas | B23K 26/03 219/121.7 |
| 2004/0094524 A1 | * | 5/2004 | Stevens | B23K 26/388 219/121.71 |
| 2004/0195730 A1 | * | 10/2004 | van Weperen | B26F 1/26 264/400 |
| 2006/0141279 A1 | * | 6/2006 | Thuis | B26F 1/26 428/596 |
| 2006/0145399 A1 | * | 7/2006 | Weisser | B23K 26/0736 264/405 |
| 2006/0191878 A1 | * | 8/2006 | Stol | B23K 5/213 219/121.46 |
| 2007/0065283 A1 | | 3/2007 | Sekihara et al. | |
| 2007/0116563 A1 | * | 5/2007 | Ahmad | F01D 5/18 415/208.1 |
| 2008/0260596 A1 | * | 10/2008 | Bouman | B01J 8/44 422/143 |
| 2009/0077976 A1 | * | 3/2009 | Hernandez | F23R 3/002 60/752 |
| 2009/0098404 A1 | * | 4/2009 | Matsuyama | B21D 28/26 428/596 |

FOREIGN PATENT DOCUMENTS

| | | | |
|---|---|---|---|
| FR | 2 668 246 A1 | 4/1992 | |
| FR | 2 893 080 A1 | 5/2007 | |
| FR | 2 899 271 A1 | 10/2007 | |
| GB | 2428608 A | * 2/2007 | ............. B23K 26/03 |

* cited by examiner

METHOD FOR PERFORATING A WALL OF A COMBUSTION CHAMBER

CROSS-REFERENCE TO RELATED APPLICATIONS

This is the U.S. National Stage of PCT/FR2012/050153, filed Jan. 24, 2012, which in turn claims priority to French Patent Application No. 1150547, filed Jan. 24, 2011, the entire contents of all applications are incorporated herein by reference in their entireties.

FIELD

This invention relates to a method for perforating a wall. In one particularly interesting embodiment, this invention relates to the field of combustion chambers for an aircraft engine gas turbine, and more particularly to a method for perforating at least one wall of a combustion chamber.

BACKGROUND

As disclosed in French patent application number 2 668 246, such a combustion chamber normally comprises two coaxial walls of revolution that extend one inside the other and are connected to each other at one of their ends by an annular chamber bottom wall comprising air intake openings and fuel inlet means.

The inner wall and the outer wall form an annular bypass duct inside which air output by a high pressure compressor located on the upstream side of the combustion chamber circulates.

Conventionally, a fraction of this air supplies the combustion zone, axially through air intake openings formed at the bottom of the chamber and transversely through primary air injection holes perforated in the inner and outer walls of the chamber.

Furthermore, the inner and outer walls of this combustion chamber usually need to be cooled, due to the high temperatures inside the combustion chamber. To achieve this, current combustion chambers use well-known multi-perforation cooling processes. Multi-perforation consists of forming a large number of cooling air injection orifices in the walls of the combustion chamber. Therefore air passing through these orifices lowers the temperature of the walls and then the temperature of the combustion chamber.

These orifices are usually made by Laser drilling. Orifices 1 (shown in FIG. 1) passing through the wall 2 of a combustion chamber are inclined at angle αl equal to about 30 degrees from to a plane P tangent to the profile of the wall 2, in order to cool a larger area. Regardless of the drilling method used, the geometric cross-section of the tool (and therefore of the laser in the example shown) is always circular. Therefore the shape of the cross-section 3 of the outer end (in other words the end located at the outer surface of the wall) of each orifice 1 (see FIG. 2) obtained by inclined penetration of a tool with a circular cross-section into the profile of the wall 2 is elliptical.

Furthermore, during the operation of the turbine machine, the inner and outer walls of the combustion chamber expand thermally and heterogeneously and large vibrations occur in them, which causes high stresses at the edges of the orifices 1.

As mentioned above, a standard combustion chamber is perforated by a multitude of cooling orifices arranged in a staggered manner, and oriented along the same direction. In one embodiment, each outer end of an orifice has an elliptical cross-section, the major axis of which is approximately parallel to the axis of the combustion chamber. Thus, in a zone in which the highest stresses are perpendicular to the axis of the combustion chamber (and therefore to the major axis of the ellipse), the highest mechanical stresses are concentrated at the small radius r of the ellipse. These stresses eventually lead to the development of cracks or fissures at the edges of orifices 1, the cracks then propagating to the adjacent orifices 1 along the direction of the axis of the combustion chamber.

This feature severely limits the life of walls forming the combustion chamber.

Another standard combustion chamber comprises walls in which some orifices also have an elliptical shape but oriented along a different direction. For example, the large radius of the elliptical-shaped section is perpendicular to the axis of the combustion chamber. Thus, if the highest stresses in the zone in which such an orifice is located are perpendicular to the axis of the combustion chamber and therefore parallel to the major axis of the ellipse, the stresses at the small radius r of the ellipse will be lower. Such an embodiment can delay the appearance of cracks at the edge of each of the orifices, at the detriment of the airflow circulating in the combustion chamber.

The main disadvantage of the above mentioned embodiment is the fact that the airflow input into the combustion chamber through this multitude of orifices oriented in different directions is not homogeneous. These different orientations hinder the axial direction of the airflows and aerodynamic disturbances are created.

SUMMARY

In this context, the purpose of the invention is a method for perforating a wall to limit stresses generated at the edges of orifices in the wall. When the wall is a wall of a combustion chamber, the invention also aims at allowing an undisturbed airflow input into the combustion chamber.

To achieve this, the invention applies to a method for perforating a wall, said method comprising a first step to calculate mechanical stresses applied on said wall for a use of said wall. Said method comprises a second step to perforate at least one orifice in a first determined zone of said wall, said perforation being made using a tool with a cross-section dependent on the mechanical stresses calculated in said first determined zone.

According to the invention, each outer end of the orifice located on the outer surface of the wall has a section adapted to the directions of the mechanical stresses that will be applied to it when it is used. More precisely, such an outer end of the orifice for which the section is adapted to the direction of the mechanical stresses that will be applied to it during use helps to limit stress concentrations and therefore to delay or even prevent the development of cracks at the edge of this orifice.

In one non-limitative embodiment of the invention, said wall is a wall of a combustion chamber and said use of said wall is functioning of said combustion chamber.

With the invention, the section of each outer end of an orifice at the outer surface of the wall is adapted to the directions of the mechanical stresses that will be applied to it during functioning of the combustion chamber. More precisely, such an outer orifice for which the section is adapted to the directions of the mechanical stresses that will be applied to it during functioning of the combustion chamber can limit stress concentrations and therefore delay or even prevent the appearance of cracks or fissures at the edge of the orifice.

The method according to the invention may also have one or several of the characteristics described below considered individually or in any technically possible combination.

In one non-limitative embodiment of the invention, a plurality of orifices are perforated, each orifice being perforated along a specific perforation axis passing through the same line circumferential to an axis of revolution of the combustion chamber, all of the perforation axes intersecting at a single point. In other words, all the orifices converge towards the same zone. Thus, the airflow circulating in the combustion chamber is not disturbed when air penetrates into the core of the combustion chamber through the orifices.

In one non-limitative embodiment of the invention, each perforation axis forms an angle of between 20 and 70 degrees with a plane tangent to said wall.

In one non-limitative embodiment of the invention, each perforation axis forms an angle of the order of 30 degrees with the tangent plane.

In one non-limitative embodiment of the invention, the perforation step is reiterated in a second determined zone.

In one non-limitative embodiment of the invention, the orifice is made by peripheral cutting. Non-limitatively, peripheral cutting is done by making several adjacent perforations or by displacement of the tool along a determined path.

In one non-limitative embodiment of the invention, at least one of the orifices has an elliptical shaped outer end, said outer end with an elliptical section being located at the outer end of the wall.

In one non-limitative embodiment of the invention, at least one of the orifices has an outer end with a circular section, said outer section with a circular section being located at the outer surface of the wall.

In one non-limitative embodiment of the invention, said tool is a laser beam, a water jet, an electro-erosion wire or any other type of tool.

The invention also relates to a wall perforated by a plurality of orifices. Said orifices are made using the perforation method according to any one of the embodiments, each orifice having an outer end, the section of which depends on the mechanical stresses calculated in the zone in which said orifice is located.

Another purpose of the invention is a wall perforated by a plurality of orifices with a similar orientation. Said wall comprises:
  orifices with an outer end with a circular cross-section,
  orifices with an outer end with an elliptical cross-section comprising a major axis approximately parallel to a determined axis,
  orifices with an outer end with an elliptical cross-section comprising a major axis approximately perpendicular to said determined axis.

In one non-limitative embodiment, the wall is a wall of a combustion chamber. The orientation of all the orifices is similar so as to obtain an undisturbed airflow inside the combustion chamber.

BRIEF DESCRIPTION OF THE DRAWINGS

Other characteristics and advantages of the method according to the invention will become clear after reading the description given below, for information and in no way limitative, with reference to the appended figures, among which:

FIGS. 6, 6A, 6B and 6C diagrammatically show three types of applied stresses that may be applied to a wall of a combustion chamber;

DETAILED DESCRIPTION

Figure 1:
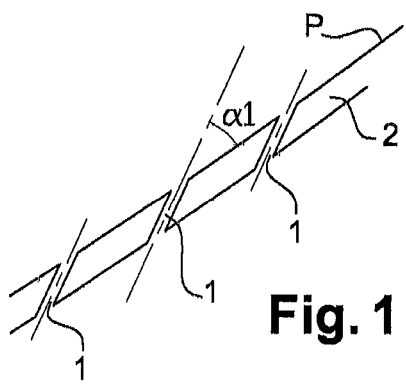
FIG. 1 shows part of a wall of a combustion chamber according to prior art.
Figure 2:
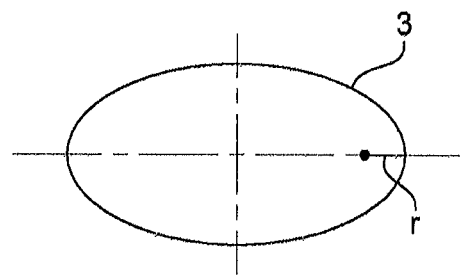
FIG. 2 shows the section of an outer end of an orifice passing through a wall of a combustion chamber according to prior art.

FIGS. 1 and 2 have been used to illustrate the state of the art.

For reasons of clarity, only elements essential for understanding the invention have been shown, diagrammatically and not to scale.

Examples according to the invention are illustrated non-limitatively with reference to the walls of a combustion chamber. Obviously, the invention is not limited to such walls and can be applied to other types of wall, for example such as a liner through which emission orifices (or holes) pass, said liner forming part of a blade. Such liners are well known to those skilled in the art and are disclosed particularly in French patent applications FR2893080 and FR2899271.

Figure 3:
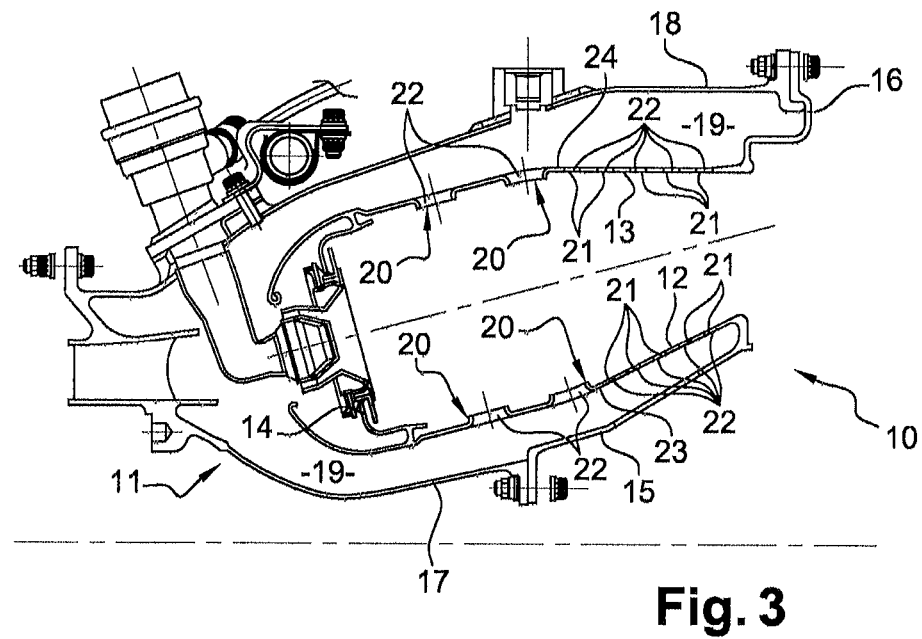
FIG. 3 diagrammatically shows an example embodiment of a combustion chamber according to the invention.

The invention is particularly applicable to a combustion chamber 10 of a turbine machine like that shown in FIG. 3.

The combustion chamber 10 is located at the outlet from a diffuser 11, itself located at the outlet from a compressor not shown, and comprises a first wall 12 (formed by an inner annular wall) and a second wall 13 (formed by an outer annular wall) connected on the upstream side to an annular chamber bottom wall 14. These first and second walls 12 and 13 are fixed on the downstream end by inner 15 and outer 16 annular flanges to an inner tapered wall 17 of the diffuser 11 and to one end of an outer casing 18 of the combustion chamber 10, respectively.

Part of the airflow supplied by the compressor that exits from the diffuser 11 supplies an annular duct 19. Air passing through this annular duct 19 penetrates into the chamber 10 through primary air inlet orifices 20 uniformly distributed around the circumference of the inner wall 12 and on the circumference of the outer wall 13.

The inner wall 12 and the outer wall 13 also comprise many cooling orifices 21 for the passage of cooling air in order to cool the inner wall 12 and the outer wall 13.

Note that each orifice 20 and 21 has an outer end 22, and the section of this outer end 22 depends on the calculated mechanical stresses in the zone in which the orifice is located during functioning of the combustion chamber 10. The outer ends 22 of the orifices 20 and 21 are located on the outer surface 23 of the inner wall 12 and on the outer surface 24 of the outer wall 13. This advantageous feature is described later.

Figure 4:
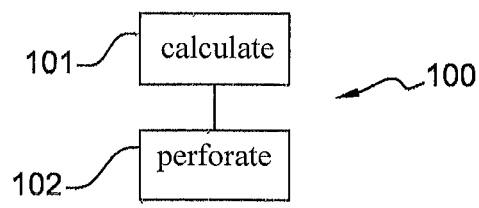
FIG. 4 shows a block diagram of the steps in the method according to the invention.

FIG. 4 shows steps in the method 100 for perforating at least one wall of a combustion chamber according to the invention. The method 100 comprises a first step 101 to calculate the mechanical stresses applied to a wall of a combustion chamber during functioning of the combustion chamber 10. During functioning, the wall is at a very high temperature generating multiple mechanical stresses distributed non-uniformly on the wall, these stresses being for example highest on the downstream side of the combustion chamber. As a reminder and as shown in FIG. 3, the inner 12 and outer 13 walls of the combustion chamber 10 are held in place at their downstream end by relatively cold inner 15 and outer 16 flanges respectively. Thus, a high stress concentration is usually present on the downstream side of the inner 12 and outer 13 walls due to the temperature difference between these walls and the flanges to which they are fixed.

In other words, this first calculation step 101 determines the mechanical stress field existing in the wall and particularly determines the direction and intensity of the mechanical stresses.

Note that mechanical stresses are calculated theoretically, in other words by digital models.

The method 100 also comprises a second step 102 to perforate at least one orifice along a first perforation axis and in a determined zone of the wall (i.e. a zone in which the mechanical stresses applied to it have been determined theoretically during the first calculation step 101). Note that this perforation 102 is made along a specific perforation axis. This specific perforation axis is inclined relative to a plane tangent to the wall so as to facilitate the path followed by air from outside the combustion chamber towards the inside of the combustion chamber.

Furthermore, the surface area along the air path increases as the inclination increases, which helps to cool a larger quantity of material in the wall.

Furthermore, the section of the tool that will be used to make the perforation 102 is chosen as a function of the stresses applied in this determined zone.

With the invention, a required shape of the outer end of the orifice (that depends on the intersection of the tool with the wall) can be obtained by modifying only the section of the tool.

Non-limitatively, FIGS. 5A to 5E illustrate different outer end sections of orifices that can be made using a method 100 conforming with the method according to the invention. More particularly, the different orifice outer end sections are obtained using a tool with a variable section, always perforating along a specific perforation axis for example forming an angle of 30 degrees with a plane tangent to the outer profile of a wall of a combustion chamber.

In other words, the different sections are obtained by modifying only the section of the tool formed for example by a laser beam.

Figure 5A:
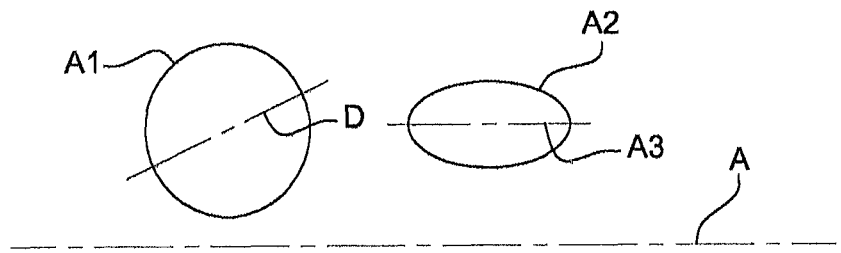
FIGS. 5A, 5B, 5C, 5D and 5E illustrate different embodiments of orifice using a method complying with that shown in FIG. 4.

Thus, for a tool with a cylindrical section A1 (for example with diameter D 0.6 mm), the section of the outer end A2 of the corresponding orifice is elliptical (see FIG. 5A). The major axis A3 of the section of the outer end A2 of the orifice is parallel to a determined axis A formed in the example by the axis of the combustion chamber A. Thus, such an elliptical geometry is advantageously used in a zone in which the direction of the stresses is parallel to the axis A of the combustion chamber.

Figure 5B:
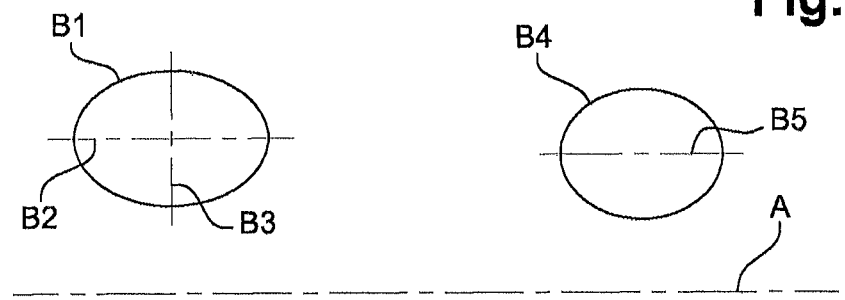

As shown in FIG. 5B, for a tool with an elliptical section B1 for which the 0.6 mm major axis B2 is parallel to the axis A of the combustion chamber and the 0.4 mm minor axis B3 is perpendicular to the major axis B2, the section of the outer end B4 of the corresponding orifice forms an ellipse for which the major axis B5 is parallel to the axis A of the combustion chamber. The major axis B5 of the section of the outer end B4 is smaller than the major axis A3 of the section of the outer end A2 as shown in FIG. 5A. This difference is due only to the section of the tool used to perforate the wall. Thus, such an elliptical geometry is used advantageously in a zone in which the direction of the principal stresses is parallel to the axis A of the combustion chamber and the direction of the minimum stresses is perpendicular to the axis A of the combustion chamber.

Figure 5C:
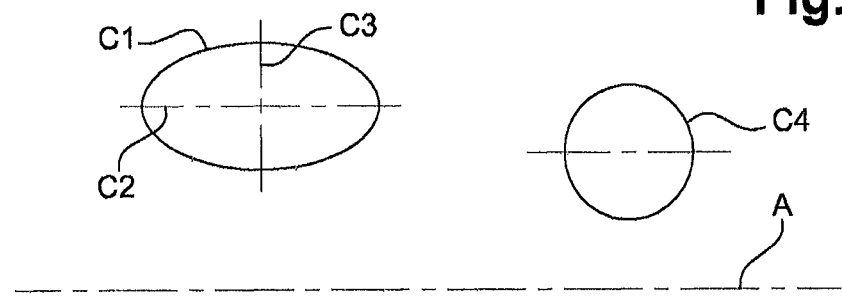

In one different embodiment shown in FIG. 5C, for a tool section C1 with an elliptical shape with a 0.8 mm major axis C2 parallel to the axis A of the combustion chamber and a 0.4 mm minor axis C3, the section of the outer end C4 of the corresponding orifice is circular.

Thus, such a circular geometry is advantageously used in a zone in which the intensities of stresses parallel to and stresses perpendicular to the axis A of the combustion chamber are approximately the same.

Figure 5D:
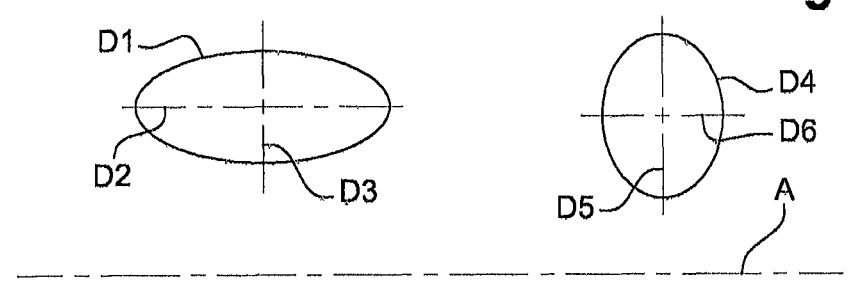

In another different embodiment shown in FIG. 5D, for a tool section D1 with an elliptical shape in which the 1 mm major axis D2 is parallel to the axis A of the combustion chamber and the minor axis D3 is 0.4 mm, the section of the outer end D4 of the corresponding orifice forms an ellipse. Note that this elliptical section D4 is not the same as that obtained with a circular shaped tool shown in FIG. 5A. In the embodiment shown in FIG. 5D, an elliptical shaped section D4 is still obtained, but the major axis D5 of this ellipse is perpendicular to the axis A of the combustion chamber and its minor axis D6 is parallel to the axis A. Therefore the ellipse is inverted. Thus, such an elliptical geometry is advantageously used in a zone in which the direction of the principal stresses is perpendicular to the axis A of the combustion chamber.

Figure 5E:
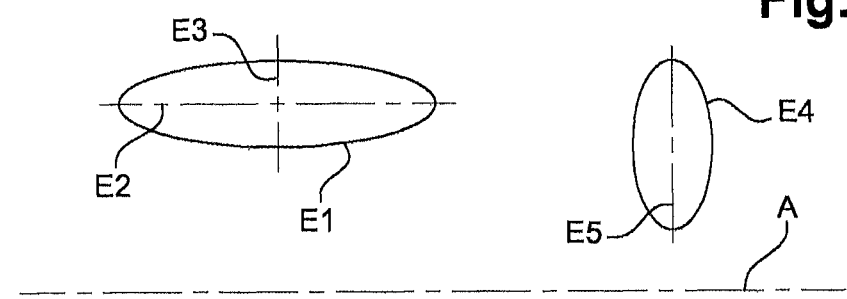
Figure 6:
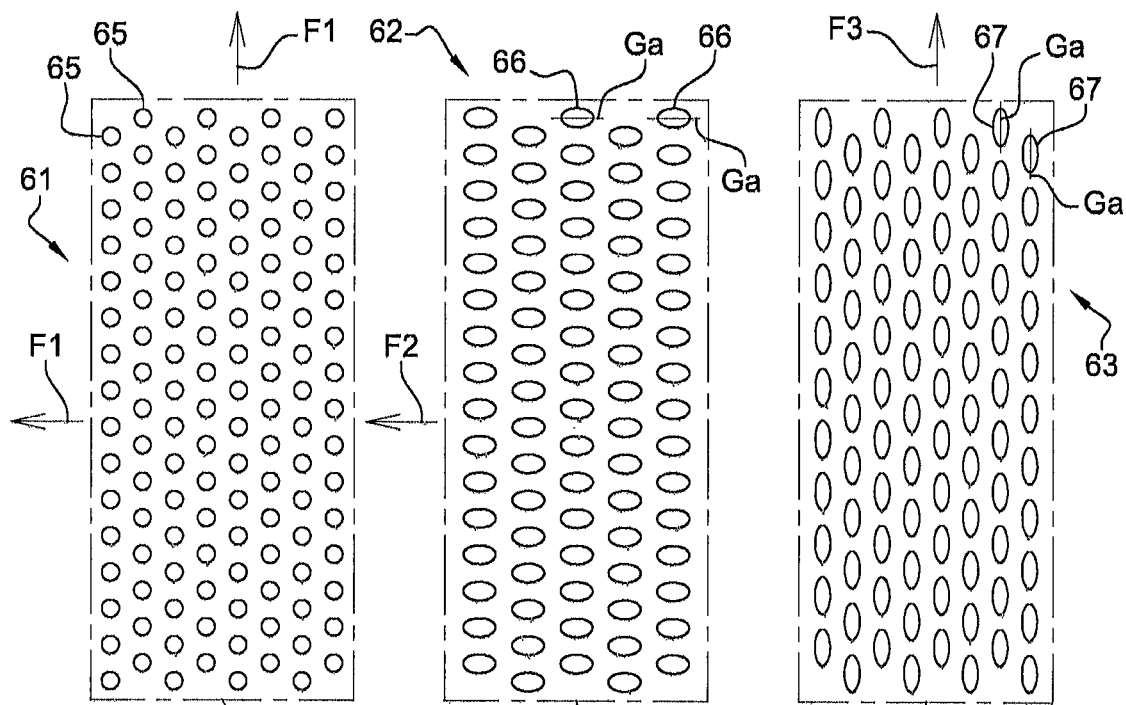
Figure 6:
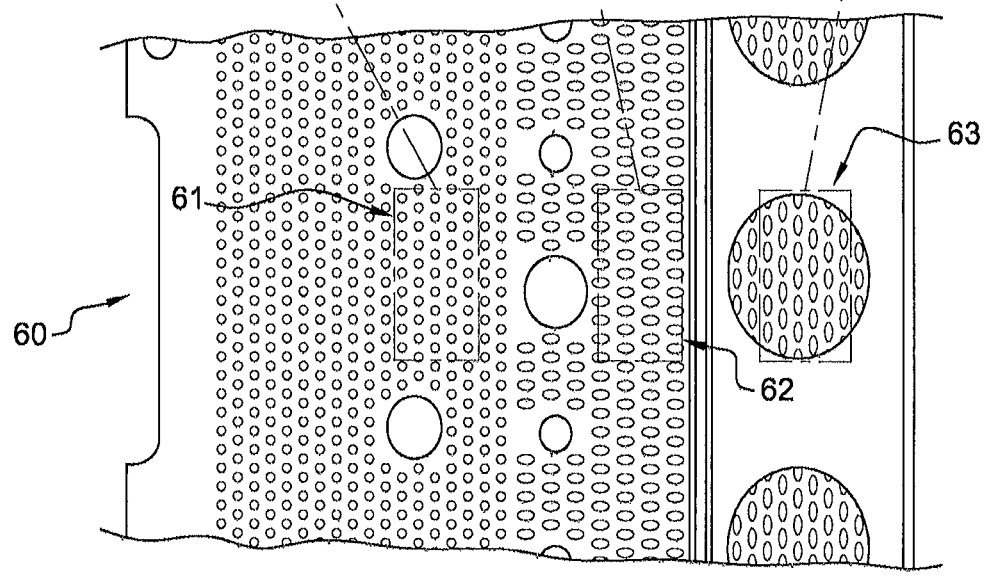

In a different embodiment shown in FIG. 5E, for a tool with an elliptical section E1 with its 1.2 mm major axis E2 parallel to the axis A of the combustion chamber and with a 0.3 mm minor axis E3, the section of the outer end E4 of the corresponding orifice forms an ellipse oriented similarly to the section of the outer end D4 show in FIG. 5D. However, the major axis E5 of the elliptical section E4 is larger than that shown in FIG. 5D. Thus, such an elliptical geometry is advantageously used in a zone in which stresses are along the direction perpendicular to the axis A of the combustion chamber.

Thus, it is quite clear from the above description, that modifying the section of the tool used can give outer orifice ends with different geometries and/or orientations.

Note that the major axis of each section of the outer end of an orifice forming an ellipse is approximately parallel to the loading direction, in other words the direction of the principal stresses.

In one non-limitative example, the tool used by the method according to the invention is a laser beam. Thus, during perforation 102 of the wall, the section of the laser beam is modified to obtain an orifice outer end section dependent on the mechanical stresses calculated in the zone in which the orifice is located.

In another non-limitative example, the tool used by the method according to the invention is a water jet.

Furthermore, when the section of the calculated orifice is small for example a diameter of 0.6 mm, it may be perforated in a single perforation step 102.

On the other hand, when the section of the calculated orifice is larger, it will be made by peripheral cutting. More particularly, peripheral cutting consists of making a plurality of small orifices, each orifice being surrounded by at least two orifices. The set of small orifices delimits the periphery of the calculated orifice and more specifically the periphery of the outer end of the orifice. In other words, peripheral cutting consists of cutting the section of the calculated outer end of the orifice by a plurality of perforations 102.

In a different embodiment, peripheral cutting is done simply by moving the tool along a specific path.

FIGS. 6, 6A, 6B and 6C diagrammatically illustrate mechanical stresses calculated on part of a wall 60 of a combustion chamber according to the invention.

In one non-limitative embodiment of the calculation step 101, the calculation 101 is made:

for a first zone 61 of the wall 60, mechanical stresses F1 perpendicular to and mechanical stresses F1 parallel to the axis A of the combustion chamber, these perpendicular and parallel mechanical stresses F1 being very similar (see FIG. 6A);

for a second zone 62 of the wall 60, high mechanical stresses F2 parallel to the axis A of the combustion chamber (see FIG. 6B);

for a third zone 63 of the wall 60, high mechanical stresses F3 perpendicular to the axis A of the combustion chamber.

With the method 100 according to the invention, the following are perforated in step 102 as a function of the mechanical stresses calculated in the calculation step 101, to prevent the formation of cracks during subsequent functioning of the combustion chamber:

in the first zone 61 of the combustion chamber, orifices 65 with a circular shaped outer end;

in the second zone 62 of the combustion chamber, orifices 66 with an elliptical shaped outer end in which the major axis Ga is parallel to the axis A of the combustion chamber in the third zone 63 of the combustion chamber, orifices 67 with an elliptical shaped outer end in which the major axis Ga is perpendicular to the axis A of the combustion chamber.

Note also that the orientation of all of the orifices 65, 66, and 67 is similar so as to achieve an undisturbed airflow inside the combustion chamber.

Note that in other embodiments, the determined axis A may be different from a combustion chamber axis and may for example be formed by the axis of rotation of a blade.

Figure 7:
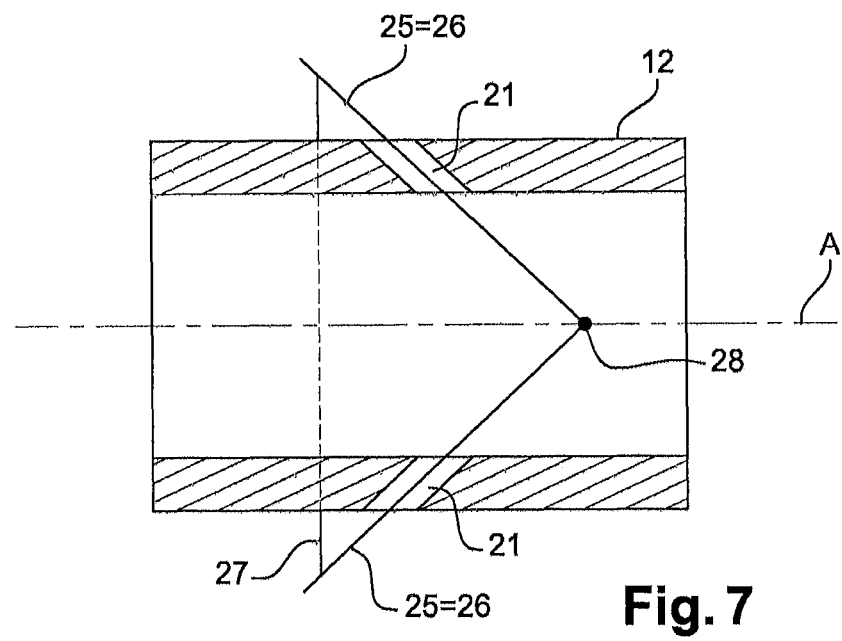
FIG. 7 diagrammatically shows a longitudinal section through part of an inner wall of a combustion chamber.

More particularly, FIG. 7 diagrammatically shows a longitudinal section of a part of an inner wall 12 of a combustion chamber 10 comprising an axis A of revolution. The inner wall 12 is perforated by a plurality of orifices 21 (only two are shown in FIG. 7). Orifices 21 are distributed around the circumference of the inner wall 12. Each orifice 21 has a longitudinal axis 25 coincident with a specific perforation axis 26. Each longitudinal axis 25 passes through the same line 27 circumferential to the axis A of revolution of the combustion chamber 10. A circumferential line 27 is a line 27 forming a circle circumferential to axis A, the centre of which is coincident with axis A.

The set of perforation axes 26 (also longitudinal axes 25) also intersect at a single point 28.

More particularly, the perforation axis 26 corresponds to the longitudinal axis of the tool used to perforate the orifice 21.

Figure 8:
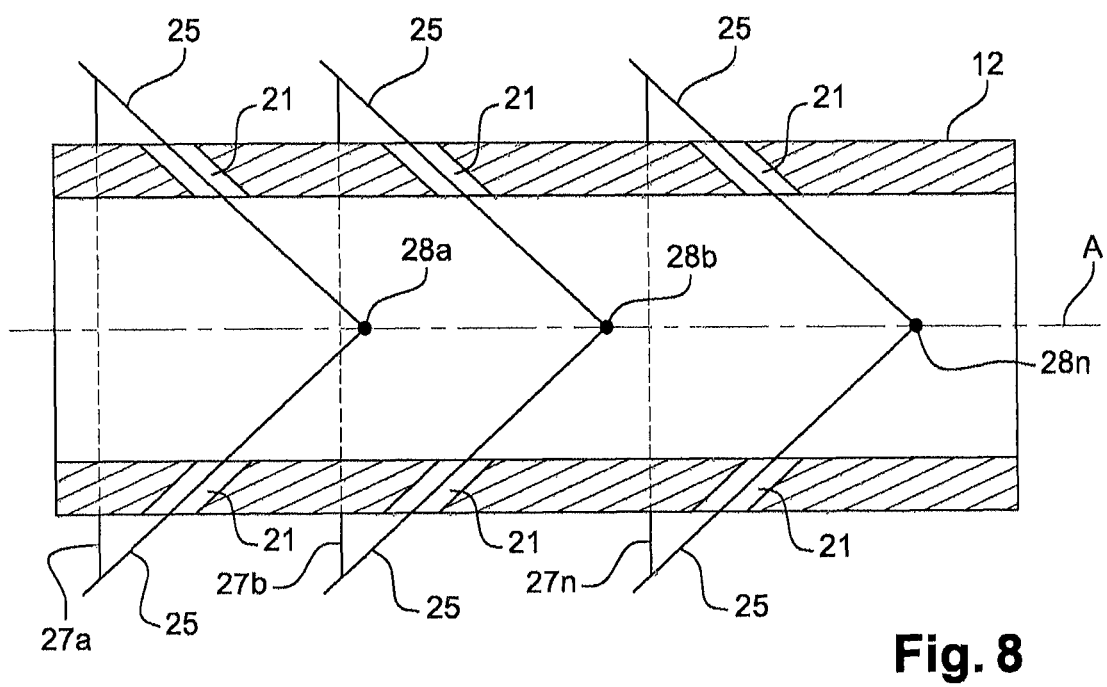
FIG. 8 diagrammatically shows a longitudinal section through part of an inner wall of a combustion chamber.

As shown in FIG. 8, the inner wall 12 is perforated by a plurality of orifices 21. Some have longitudinal axes 25 passing through a first line 27a circumferential to the axis of revolution A of the combustion chamber, all these longitudinal axes 25 intersecting at a single point 28a.

Other orifices 21 have longitudinal axes 25 passing through a second line 27b circumferential to the axis of revolution A of the combustion chamber, the second circumferential line 27b being axially shifted from the first circumferential line 27a. All of these longitudinal axes 25 passing through the second line 27b also intersect at a single second point 28b.

Other orifices 21 have longitudinal axes 25 passing through an nth line 27n circumferential to the axis of revolution A of the combustion chamber, the nth line 27n being axially shifted from the first and second circumferential lines 27a and 27b. All of these longitudinal axes 25 passing through the nth line 27n intersect at a single nth point 28n.

The perforation method and the combustion chamber according to the invention are particularly applicable in the aeronautical field.

The invention claimed is:

1. A method for perforating a wall of a combustion chamber, said method comprising: before perforating at least one orifice in a first determined zone of said wall and at least one orifice in a second determined zone of said wall, calculating mechanical stresses applied on said wall when said combustion chamber is in operation, and after said calculating, perforating the at least one orifice in the first determined zone of said wall, said perforation being made using a tool with a cross-section dependent on the mechanical stresses calculated in said first determined zone,
wherein after said perforating, the perforation is reiterated in the second determined zone, said perforation in the second determined zone being made using a tool with a cross-section dependent on the mechanical stresses calculated in said second determined zone, and
wherein each orifice is perforated along a specific perforation axis passing through a same line circumferential to an axis of revolution of the combustion chamber, all of the perforation axes intersecting at a single point.

2. The method according to claim 1, wherein each perforation axis forms an angle of between 20 and 70 degrees with a plane tangent to said wall.

3. The method according to claim 1, the at least one orifice in the first determined zone is made by peripheral cutting.

4. The method according to claim 1, wherein the at least one orifice in the first determined zone has an elliptical shaped outer end, said outer end with an elliptical section being located at the outer surface of the wall.

5. The method according to claim 1, wherein the at least one orifice in the first determined zone has an outer end with a circular section, said outer section with a circular section being located at an outer surface of the wall.

6. The method according to claim 1, wherein the tool used to make the perforation in the first determined zone or the second determined zone or both is:
a laser beam, or
a water jet.

7. The method according to claim 1, wherein the orifice in said first determined zone is perforated with a first cross-section and the orifice in said second determined zone is perforated with a second cross-section, the first cross-section being different than the second cross-section.

8. The method according to claim 7, further comprising perforating orifices in said wall with a third cross-section on the basis of the mechanical stresses calculated in said first determined zone, wherein said third cross-section is different from the first and second cross-sections.

9. The method according to claim 1, wherein the mechanical stresses applied on said wall when said aircraft engine is in operation are calculated theoretically.

10. A wall of a combustion chamber perforated by a plurality of orifices with a similar orientation, said wall comprising:
- first orifices of the plurality of orifices with an outer end with a circular cross-section,
- second orifices of the plurality of orifices with an outer end with a first elliptical cross-section comprising a first major axis parallel to a determined axis,
- third orifices of the plurality of orifices with an outer end with a second elliptical cross-section comprising a second major axis perpendicular to said determined axis,
- wherein the cross-sections of the first, second and third orifices are based upon mechanical stresses applied on said wall when said combustion chamber is in operation, said mechanical stresses being determined before perforating the first, second and third orifices, and
- wherein each orifice is perforated along a specific perforation axis passing through a same line circumferential to an axis of revolution of the combustion chamber, all of the perforation axes intersecting at a single point.

11. The method according to claim 7, wherein the mechanical stresses applied on said wall when said aircraft engine is in operation are calculated theoretically.

* * * * *